106. COMPOSITIONS, COATING OR PLASTIC.
75

Patented Aug. 13, 1929.

1,724,185

UNITED STATES PATENT OFFICE.

NATHANIEL M. ELIAS, OF NEW YORK, N. Y.

ALKALI SILICATE PRODUCT AND METHOD OF MAKING SAME.

No Drawing.   Application filed July 6, 1927.   Serial No. 203,874.

This invention relates to improved insulating and sound-proofing products and to a process of making them. It has for its chief object the economical production of materials having great heat insulating and sound-proofing properties from alkali silicates or mixtures containing chiefly alkali silicates.

Prior to my present invention it has been proposed to produce a heat insulating, cellular material from alkali silicates by the heating of the hydrated substance both with and without agitation. My study of the subject indicates, however, that the superior product which my invention contemplates requires the observance of conditions of heating of the starting material which so far as is known to me have not been disclosed in such prior proposed methods for the making of this product.

My study of the problem presented has further shown that it is highly desirable that the insulating material be of a uniformly cellular structure of low specific gravity with very small cells. I have now discovered that a product having this structure may be obtained by carrying out the heating process in two steps and by the careful observance of conditions as will be set forth in detail. The invention also contemplates the manufacture of the improved insulating material in the form of molded shapes or slabs, whereby the use of a binder is obviated.

In order that my invention may be fully understood, I now give the following examples illustrative of my improved method:

(1) Commercial sodium silicate solution having for example a $Na_2O$ to $SiO_2$ ratio of approximately 1:3.25 is first evaporated preferably without agitation at a temperature slightly below 100° C. at atmospheric pressure. At 95° C. about five hours will be required to evaporate a solution of a depth sufficient to produce a cake of material two inches thick. By proceeding carefully in this manner, it is readily possible to accomplish the evaporation without the formation of a crust. If desired, the rate of evaporation may be increased and the formation of a crust avoided by heating the mass under a slight pressure at higher temperature, i. e. at from 100° to 200° C. under a pressure of 1.5 atmospheres absolute, and regulating the evaporation so that it does not exceed the rate of diffusion of water vapor through the drying film of silicate otherwise excessive stratification into layers of substantially varying moisture content is apt to occur. In this manner the evaporation of a thickness of solution above mentioned may be carried out in one hour or less.

The evaporation is stopped at such a point that the resulting product contains 27% or less of moisture. It is a glassy solid which at temperatures above 200° C. is no longer sufficiently fluid to form large bubbles when the moisture escapes during the subsequent heating or baking step to be described.

The intermediate product as prepared above or by other methods to be described is now baked at temperatures between 200° and 500° C. depending on the physical properties desired in the end product preferably without agitation and in a closed, uniformly heated oven. Previous to the baking step, the material has been placed in suitable molds. The heating is continued until the moisture content has been very much reduced or completely eliminated. After baking, the puffy mass which resembles a dense foam is cooled slowly so that it may have an opportunity to anneal somewhat and avoid danger of crack formation, and is then removed from the molds. If the baking has been carried out properly, the latter operation may be performed without difficulty, as the product sticks only slightly. It may then be cut into suitable shapes for use.

If desired, the product may be given a water proof coating and this may be done by dipping it in or spraying it with a molten water proofing material, such as paraffin, pitch or asphalt, or by wrapping it in a water proofing paper or fabric.

(2) Low-moisture-containing silicate powder may be heated with a silicate solution containing more than the desired amount of moisture so that the moisture content of the resulting mixture is reduced. An advantage of this method consists in the fact that the trimmings produced from cutting the finished cakes may be utilized. This method may advantageously be carried out along with the method first described. The heating is performed similarly to that described in the first example and the intermediate product obtained is in all respects similar to that described. The second heating step is the same as above set forth in Example 1.

(3) Anhydrous alkali silicate glass similar to that used in the manufacture of commercial silicate solutions is dissolved in an autoclave with the calculated amount of water and the temperature and pressure maintained at such values as to cause the mixture to become homogeneous and to be fluid enough to be discharged into molds under pressure. The pressure within the molds may then be gradually released as the mass cools. This produces an intermediate product which may be treated in the manner already described.

In the practice of the method as outlined in the foregoing examples, it may be pointed out that the exact amount of moisture to be left in the intermediate product varies somewhat with the composition of the silicate solution, i. e., with the ratio of $Na_2O$ to $SiO_2$, the higher this ratio, the lower the moisture which should be left in the product prior to the baking step in order to avoid large cell formation. As a rule, however, all commercial silicates must be reduced to at least 35% moisture and in some cases to 25% or less. With as low a moisture content as 20% I have obtained a satisfactory final product.

By the use of the methods above described in detail, a product having low specific gravity and small uniform cells is produced. I attribute this beneficial property imparted to the material to the fact that the mass is relatively non-fluid when the moisture is driven off during the second or baking step. I have found that when it is attempted to carry out the final heating step with semi-fluid silicate that large and irregular cells are produced, and the resulting material has a widely varying specific gravity. I have furthermore found that by the use of agitation which has been previously proposed, a considerable breaking down of the cells and crushing of the mass results, and thus a product of inferior grade is produced. Furthermore, this mode of heating usually requires an open oven, the use of which makes it difficult to obtain a uniform heating.

My experimentation has indicated that it is not necessarily the formation of a crust in itself which causes trouble, but the fact that the bottom layer of the drying material has a different moisture content than the middle layer and that this has a different moisture content than the top layer if the drying is not properly carried out, so that the moisture content is not uniform and the material puffs up differently in the different layers on baking, giving a non-uniform product even if the total moisture content is correct.

In general my improved product is characterized by cells of uniform size not exceeding ¼ inch in the longest dimension. For the most part, the cells are very much smaller. In spite of the small size of the cells, the specific gravity of the material obtained is below 0.15 and can be reduced to less than 0.05 if desired. The combination of this extremely low specific gravity with the small cell size and the fact that the material can be made in pieces as thick as three inches or more renders the product one of great value as a heat insulator, sound-proofing material and for other purposes.

As has been stated I may, and preferably do, obtain the final product as a slab which is either molded to, or may be cut to the desired size and shape. The use of the material in this form has the advantage over its use in divided form or pellets, in that there is no tendency of the undivided material to settle and thus become non-uniform.

What I claim is:

1. Alkali silicate material in the form of a uniformly cellular slab not less than one inch in thickness, the cells of which do not exceed one-quarter inch in their longest dimension, and having specific gravity not exceeding 0.15 but greater than approximately 0.05.

2. A slab composed wholly of alkali silicate material not less than one inch in thickness and of uniform cellular structure and having a specific gravity not exceeding 0.15.

3. In the method of making a heat insulator, the step which consist in evaporating a commercial alkali silicate solution at such a rate as not substantially to exceed the rate of diffusion of water vapor through the drying film formed thereupon until said solution contains not substantially over 35% water.

4. In the method of making a heat insulator, the step which consists in evaporating under a pressure not less than atmospheric a commercial alkali silicate solution at such a rate as not substantially to exceed the rate of diffusion of water vapor through the drying film formed thereupon until said solution contains not substantially over 35% water.

5. In the method of making a heat insulator, the steps which consist in evaporating hydrous alkali silicate at superatmospheric pressure and regulating the amount of heat supplied so that the rate of evaporation does not substantially exceed the rate of diffusion of water vapor through the drying film formed thereupon.

6. The method of treating alkali silicate material which consists in heating same in the form of a glassy solid to temperatures between 200°–500° C., and coating the material with a waterproofing substance.

7. In the method of treating alkali silicate material the step which consists in heating said material in the form of a glassy solid without agitation in a closed oven to temperatures between 200–500 degrees C.

8. In the method of treating alkali silicate material, the steps which consist in heating said material without agitation to remove water therefrom until said material is in the form of a glassy solid, forming the said material in molds, and then baking same in undivided form to temperatures between 200–500 degrees C. to form a substantially uniform cellular mass.

9. In the method of treating alkali silicate material, the step which consists in preliminarily heating said material to dehydrate same, said heating step being carried out under temperature-pressure conditions equivalent of 100 degrees C. at atmospheric pressure, and at such a rate that said material is evaporated without excessive stratification into layers of substantially varying moisture content.

10. In the method of treating alkali silicate material, the step which consists in preliminarily heating said material to dehydrate same, said heating step being carried out at from 100–200 degrees C. at a pressure of substantially 1.5 atmospheres absolute and at such a rate that said material is evaporated without excessive stratification into layers of substantially varying moisture content.

In testimony whereof I have affixed my signature to this specification.

NATHANIEL M. ELIAS.